(12) United States Patent
Teggatz et al.

(10) Patent No.: US 10,854,378 B2
(45) Date of Patent: Dec. 1, 2020

(54) WIRELESS POWER TRANSMITTAL

(71) Applicant: TRIUNE IP LLC, Plano, TX (US)

(72) Inventors: Ross E. Teggatz, The Colony, TX (US); Wayne T. Chen, Plano, TX (US)

(73) Assignee: TRIUNE IP LLC, Plano, TX (US)

( * ) Notice: Subject to any disclaimer, the term of this patent is extended or adjusted under 35 U.S.C. 154(b) by 845 days.

(21) Appl. No.: 15/390,615

(22) Filed: Dec. 26, 2016

(65) Prior Publication Data
US 2017/0125161 A1 May 4, 2017

Related U.S. Application Data

(63) Continuation-in-part of application No. 15/231,232, filed on Aug. 8, 2016, now Pat. No. 9,559,585, and a continuation-in-part of application No. 15/165,870, filed on May 26, 2016, now Pat. No. 9,599,660, said application No. 15/231,232 is a continuation of application No. 14/805,331, filed on Jul. 21, 2015, now Pat. No. 9,413,237, application No. 15/390,615, which is a continuation-in-part of application No. 14/798,700, filed on Jul. 14, 2015, now Pat. No. 9,548,796, and a continuation-in-part of application No. 14/630,415, filed on Feb. 24, 2015, now Pat. No. 9,559,596, said application No. 15/165,870 is a continuation of application No. 14/553,941, filed on Nov. 25, 2014, now Pat. No. 9,354,268, which is a continuation of application No. 13/914,501, filed on Jun. 10, 2013, now Pat. No. 8,896,318, application No. 15/390,615, which is a continuation-in-part of
(Continued)

(51) Int. Cl.
| | | |
|---|---|---|
| H01F 38/14 | (2006.01) | |
| H02J 50/10 | (2016.01) | |
| H02J 50/80 | (2016.01) | |
| H02J 7/02 | (2016.01) | |
| H02J 50/40 | (2016.01) | |

(52) U.S. Cl.
CPC .............. H01F 38/14 (2013.01); H02J 50/10 (2016.02); H02J 50/80 (2016.02); *H02J 7/025* (2013.01); *H02J 50/40* (2016.02)

(58) Field of Classification Search
CPC . H01F 38/14; H02J 50/80; H02J 50/10; H02J 7/025
USPC ........................................................ 307/104
See application file for complete search history.

(56) References Cited

U.S. PATENT DOCUMENTS

| | | |
|---|---|---|
| 3,573,751 A | 4/1971 | DeLisle |
| 5,450,076 A | 9/1995 | Donig et al. |
| (Continued) | | |

FOREIGN PATENT DOCUMENTS

| | | |
|---|---|---|
| EP | 1826498 | 8/2007 |
| WO | 2010/104569 | 9/2010 |
| (Continued) | | |

*Primary Examiner* — Alfonso Perez Borroto
(74) *Attorney, Agent, or Firm* — Jackson Walker LLP; Christopher J. Rourk

(57) ABSTRACT

Wireless power transmittal apparatus and systems are disclosed in which transmitter and receiver inductors, or coils, are coupled in configurations for wirelessly transferring power and/or data among them. In preferred implementations, a plurality of non-coplanar primary side coils are provided in power transmittal apparatus for transmitting power, or power and data.

20 Claims, 4 Drawing Sheets

Related U.S. Application Data application No. 13/852,780, filed on Mar. 28, 2013, now Pat. No. 9,602,167, and a continuation-in-part of application No. 13/616,726, filed on Sep. 14, 2012, now Pat. No. 9,553,457, said application No. 14/630,415 is a continuation of application No. 13/540,883, filed on Jul. 3, 2012, now Pat. No. 8,964,418, application No. 14/798,700, which is a continuation-in-part of application No. 13/434,807, filed on Mar. 29, 2012, now Pat. No. 9,530,555, said application No. 14/805,331 is a continuation of application No. 13/355,416, filed on Jan. 20, 2012, now Pat. No. 9,083,391, said application No. 13/914,501 is a continuation of application No. 13/232,855, filed on Sep. 14, 2011, now Pat. No. 9,089,029, which is a continuation of application No. 12/710,307, filed on Feb. 22, 2010, now Pat. No. 8,461,847.

(60) Provisional application No. 61/616,860, filed on Mar. 28, 2012, provisional application No. 61/534,401, filed on Sep. 14, 2011, provisional application No. 61/504,293, filed on Jul. 4, 2011, provisional application No. 61/468,685, filed on Mar. 29, 2011, provisional application No. 61/434,622, filed on Jan. 20, 2011, provisional application No. 61/382,747, filed on Sep. 14, 2010, provisional application No. 61/154,704, filed on Feb. 23, 2009.

(56) References Cited

U.S. PATENT DOCUMENTS

| | | | | |
|---|---|---|---|---|
| 5,461,318 | A | 10/1995 | Borchert et al. | |
| 5,479,610 | A | 12/1995 | Roll-Mecak et al. | |
| 5,686,813 | A | 11/1997 | Huen et al. | |
| 6,188,587 | B1 | 2/2001 | Yun et al. | |
| 6,297,635 | B1* | 10/2001 | Arz | G01R 33/385 324/318 |
| 6,944,554 | B2 | 9/2005 | Kim et al. | |
| 7,053,601 | B1 | 5/2006 | Fenske et al. | |
| 7,064,968 | B2 | 6/2006 | Choi et al. | |
| 7,215,924 | B2 | 5/2007 | Palermo et al. | |
| 7,218,120 | B2 | 5/2007 | Shimoyama et al. | |
| 7,425,803 | B2 | 9/2008 | Shao et al. | |
| 7,426,239 | B2 | 9/2008 | Taghizadeh-Kaschani | |
| 7,650,187 | B2 | 1/2010 | Gruber et al. | |
| 7,701,739 | B2 | 4/2010 | Mollo | |
| 7,808,127 | B2 | 10/2010 | Teggatz et al. | |
| 7,827,334 | B2 | 11/2010 | Teggatz et al. | |
| 7,859,911 | B2 | 12/2010 | Teggatz et al. | |
| 7,969,155 | B2 | 6/2011 | Varghai et al. | |
| 7,982,492 | B2 | 7/2011 | Atrash et al. | |
| 8,067,948 | B2 | 11/2011 | Sequine | |
| 8,102,713 | B2 | 1/2012 | Teggatz et al. | |
| 8,102,718 | B2 | 1/2012 | Teggatz et al. | |
| 8,300,375 | B2 | 10/2012 | Teggatz et al. | |
| 8,373,436 | B2 | 2/2013 | Atrash et al. | |
| 8,408,900 | B2 | 4/2013 | Teggatz et al. | |
| 8,441,866 | B2 | 5/2013 | Teggatz et al. | |
| 8,461,847 | B2 | 6/2013 | Teggatz et al. | |
| 8,508,142 | B2 | 8/2013 | Lin et al. | |
| 8,552,336 | B2 | 10/2013 | Blackall et al. | |
| 8,583,037 | B2 | 11/2013 | Atrash et al. | |
| 8,584,961 | B2 | 11/2013 | Teggatz et al. | |
| 8,654,113 | B2 | 2/2014 | Lin et al. | |
| 8,664,745 | B2 | 3/2014 | Teggatz et al. | |
| 8,687,385 | B2 | 4/2014 | Teggatz et al. | |
| 8,693,261 | B2 | 4/2014 | Teggatz et al. | |
| 8,704,450 | B2 | 4/2014 | Chen et al. | |
| 8,743,522 | B2 | 6/2014 | Teggatz et al. | |
| 8,768,455 | B2 | 7/2014 | Teggatz et al. | |
| 8,896,318 | B2 | 11/2014 | Teggatz et al. | |
| 8,901,878 | B2 | 12/2014 | Prutchi et al. | |
| 8,957,549 | B2 | 2/2015 | Kesler et al. | |
| 8,964,418 | B2 | 2/2015 | Atrash et al. | |
| 9,083,391 | B2 | 7/2015 | Teggatz et al. | |
| 9,089,029 | B2 | 7/2015 | Teggatz et al. | |
| 9,106,221 | B2 | 8/2015 | Atrash et al. | |
| 9,134,741 | B2 | 9/2015 | Atrash et al. | |
| 9,214,867 | B2 | 12/2015 | Teggatz et al. | |
| 9,225,199 | B2 | 12/2015 | Teggatz et al. | |
| 9,225,293 | B2 | 12/2015 | Teggatz et al. | |
| 9,231,400 | B2 | 1/2016 | Chen et al. | |
| 9,343,988 | B2 | 5/2016 | Teggatz et al. | |
| 9,354,268 | B2 | 5/2016 | Teggatz et al. | |
| 2002/0140234 | A1 | 10/2002 | Wall et al. | |
| 2002/0190579 | A1 | 12/2002 | Odaohhara et al. | |
| 2003/0178976 | A1 | 9/2003 | Xi | |
| 2004/0004483 | A1 | 1/2004 | Hazelton | |
| 2004/0005898 | A1 | 1/2004 | Kato et al. | |
| 2004/0046475 | A1* | 3/2004 | Holzheu | H02K 3/12 310/201 |
| 2004/0076022 | A1 | 4/2004 | Hong et al. | |
| 2005/0151659 | A1 | 7/2005 | Donovan et al. | |
| 2006/0265181 | A1 | 11/2006 | Stewart | |
| 2007/0010295 | A1 | 1/2007 | Greene et al. | |
| 2007/0159186 | A1 | 7/2007 | Grund | |
| 2008/0053441 | A1 | 3/2008 | Gottlib et al. | |
| 2008/0297069 | A1 | 12/2008 | Shao et al. | |
| 2009/0009180 | A1 | 1/2009 | Varghai et al. | |
| 2009/0134712 | A1 | 5/2009 | Cook et al. | |
| 2009/0243394 | A1* | 10/2009 | Levine | H02J 5/005 307/104 |
| 2009/0243397 | A1 | 10/2009 | Cook et al. | |
| 2009/0247199 | A1 | 10/2009 | Oodachi et al. | |
| 2010/0052431 | A1 | 3/2010 | Mita | |
| 2010/0097894 | A1 | 4/2010 | Kubota et al. | |
| 2010/0146308 | A1 | 6/2010 | Gioscia et al. | |
| 2010/0164297 | A1 | 7/2010 | Kurs et al. | |
| 2010/0201311 | A1* | 8/2010 | Lyell Kirby | A61L 2/02 320/108 |
| 2010/0244579 | A1 | 9/2010 | Sogabe et al. | |
| 2011/0004278 | A1* | 1/2011 | Aghassian | A61N 1/3787 607/61 |
| 2011/0008527 | A1 | 1/2011 | Teggatz et al. | |
| 2011/0031928 | A1 | 2/2011 | Soar | |
| 2011/0102411 | A1 | 5/2011 | Chang et al. | |
| 2011/0285212 | A1 | 11/2011 | Higuma et al. | |
| 2012/0025752 | A1 | 2/2012 | Teggatz et al. | |
| 2012/0028845 | A1 | 2/2012 | Teggatz et al. | |
| 2012/0032632 | A1 | 2/2012 | Soar | |
| 2012/0139357 | A1 | 6/2012 | Teggatz et al. | |
| 2012/0139477 | A1 | 6/2012 | Oglesbee et al. | |
| 2012/0153732 | A1* | 6/2012 | Kurs | H03H 7/40 307/104 |
| 2012/0188673 | A1 | 7/2012 | Teggatz et al. | |
| 2012/0206947 | A1 | 8/2012 | Haight et al. | |
| 2012/0212981 | A1 | 8/2012 | Lin | |
| 2012/0235506 | A1 | 9/2012 | Kallal et al. | |
| 2012/0235508 | A1 | 9/2012 | Ichikawa | |
| 2012/0242164 | A1 | 9/2012 | Teggatz et al. | |
| 2012/0248893 | A1 | 10/2012 | Teggatz et al. | |
| 2012/0274838 | A1 | 11/2012 | Teggatz et al. | |
| 2013/0062967 | A1 | 3/2013 | Teggatz et al. | |
| 2013/0175982 | A1 | 7/2013 | Teggatz et al. | |
| 2013/0181724 | A1 | 7/2013 | Teggatz et al. | |
| 2013/0193771 | A1 | 8/2013 | Teggatz | |
| 2013/0224679 | A1 | 8/2013 | Teggatz et al. | |
| 2013/0241465 | A1 | 9/2013 | Teggatz et al. | |
| 2013/0257171 | A1 | 10/2013 | Teggatz et al. | |
| 2013/0257172 | A1 | 10/2013 | Teggatz et al. | |
| 2014/0062381 | A1 | 3/2014 | Teggatz et al. | |
| 2014/0225447 | A1 | 8/2014 | Teggatz | |
| 2014/0329720 | A1 | 11/2014 | Teggatz et al. | |
| 2015/0130287 | A1 | 5/2015 | Steudtner et al. | |
| 2015/0171758 | A1 | 6/2015 | Atrash et al. | |
| 2015/0256227 | A1 | 9/2015 | Teggatz et al. | |
| 2015/0318899 | A1 | 11/2015 | Teggatz et al. | |
| 2015/0326118 | A1 | 11/2015 | Teggatz et al. | |
| 2015/0341087 | A1 | 11/2015 | Moore et al. | |
| 2015/0372676 | A1 | 12/2015 | Teggatz et al. | |
| 2016/0004267 | A1 | 1/2016 | Atrash et al. | |

(56) References Cited

U.S. PATENT DOCUMENTS

| | | |
|---|---|---|
| 2016/0033979 A1 | 2/2016 | Teggatz et al. |
| 2016/0105115 A1 | 4/2016 | Teggatz et al. |
| 2016/0134099 A1 | 5/2016 | Teggatz et al. |
| 2016/0134191 A1 | 5/2016 | Teggatz et al. |

FOREIGN PATENT DOCUMENTS

| | | |
|---|---|---|
| WO | 2015/195403 | 12/2015 |
| WO | 2016/019137 | 2/2016 |
| WO | 2016/019139 | 2/2016 |

\* cited by examiner

WIRELESS POWER TRANSMITTAL

RELATED APPLICATIONS

The present application is a continuation-in-part of U.S. patent application Ser. No. 13/434,807, filed Mar. 29, 2012, now U.S. Pat. No. 9,530,555, which is entitled to priority based on Provisional Patent Application Ser. No. 61/468,685, filed on Mar. 29, 2011; is in turn a continuation-in-part of U.S. patent application Ser. No. 15/231,232, filed Aug. 8, 2016, which is a continuation of U.S. patent application Ser. No. 14/805,331, filed Jul. 21, 2015, now U.S. Pat. No. 9,413,237, which is a continuation of U.S. patent application Ser. No. 13/232,855, filed Sep. 14, 2011, now U.S. Pat. No. 9,089,029, which claims priority to and benefit of U.S. Provisional Patent Application Ser. No. 61/382,747, filed on Sep. 14, 2010; is a continuation-in-part of U.S. patent application Ser. No. 14/630,415, filed Feb. 24, 2015, which is a continuation of U.S. patent application Ser. No. 13/540,883, filed Jul. 3, 2012, now U.S. Pat. No. 8,964,418, and claims priority based on Provisional Patent Application Ser. No. 61/504,293, filed Jul. 4, 2011; is a continuation-in-part of U.S. patent application Ser. No. 14/798,700, filed Jul. 14, 2015, which is a continuation of U.S. patent application Ser. No. 13/355,416, filed Jan. 20, 2012, now U.S. Pat. No. 9,083,391, and claims priority based on Provisional Patent Application Ser. No. 61/434,622, filed Jan. 20, 2011; is a continuation-in-part of U.S. patent application Ser. No. 13/616,726, filed Sep. 14, 2012, which claims priority based on Provisional Patent Application Ser. No. 61/534,401, filed Sep. 14, 2011; is a continuation-in-part of U.S. patent application Ser. No. 15/165,870, filed May 26, 2016, which is a continuation of U.S. patent application Ser. No. 14/553,941, filed Nov. 25, 2014, now U.S. Pat. No. 9,354,268, which is a continuation of U.S. patent application Ser. No. 13/914,501, filed Jun. 10, 2013, now U.S. Pat. No. 8,896,318, which is a continuation of U.S. patent application Ser. No. 12/710,307, filed Feb. 22, 2010, now U.S. Pat. No. 8,461,847, and claims priority based on Provisional Patent Application Ser. No. 61/154,704, filed Feb. 23, 2009; is a continuation-in-part of U.S. patent application Ser. No. 13/852,780, filed Mar. 28, 2013, which claims priority based on Provisional Patent Application Ser. No. 61/616,860, filed Mar. 28, 2012, which are incorporated herein for all purposes by there references. These applications and the Provisional Patent Applications have at least one common inventor.

TECHNICAL FIELD

The invention relates to coupled inductor systems. More particularly, the invention relates to coupled inductor systems for use in wireless power and data transfer applications. In preferred embodiments employed in wireless power applications, the invention relates to the more efficient utilization of energy resources.

BACKGROUND OF THE INVENTION

Inductive coupling is an effect used to transfer electrical energy from one circuit to an adjacent circuit through inductive coils. A variable current on a primary coil is used to create a varying magnetic field, and thus a voltage, in a secondary coil. Wireless charging systems employing inductive coupling are useful for transferring energy from one apparatus to another. Such systems are used for supplying power, charging batteries, and in some cases also for transferring data. Challenges inherent in such systems include providing efficiency in transferring power. Inefficient systems generate excess heat and are limited in their maximum power transfer capability. Charging of common electronic apparatus, such as 3D glasses, toys, remote controls and other portable rechargeable electronics traditionally has required wired plugs to be inserted into the apparatus as a source of power for the charging of batteries. Techniques using inductive resonance can transmit power, but are limited in their utility, in part by the geometry of charging systems known in the art. Known inductive resonance systems are designed to transmit signals from point-to-point in a generally co-planar orientation, or between members of parallel-plane coil pairs. Moreover, wireless charging systems typically are capable of charging only one device at a time.

Due to these and other problems and potential problems, improved coupled inductor systems for wireless power transmittal would be useful and advantageous contributions to the arts. In particular, apparatus capable of charging two or more devices simultaneously, and in different orientations, e.g., not necessarily co-planar point-to-point, would be a useful and advantageous contribution to the art.

SUMMARY OF THE INVENTION

In carrying out the principles of the present invention, in accordance with preferred embodiments, the invention provides advances in the arts with novel apparatus directed to the transfer of power and/or data using inductive couplings among coils. In preferred embodiments, systems include capabilities for power and/or data transfer. Preferably, the coupled coils of systems of the invention are not permanently physically interconnected.

According to aspects of the invention, examples of preferred embodiments include multiple coil wireless power transmittal systems including at least two primary side coils for transmitting a signal. In systems also equipped with a secondary side, the coils are not physically affixed to one another. When positioned in proximity, the primary and secondary side coils are electromagnetically, but not physically coupled such that one or more signals may be passed between the coils.

According to aspects of the invention, in an example of presently preferred embodiments, apparatus for wireless power transmittal includes a primary side with non-coplanar primary coils. Driver circuitry is connected with the primary coils in a configuration suitable for transmitting a signal from the driver through the primary side coils.

According to aspects of the invention, some of the preferred embodiments additionally include a secondary side having a secondary side coil adapted for receiving a power signal from the primary side coils.

According to aspects of the invention, preferred embodiments of the invention include apparatus for wireless power transmittal wherein the primary side having data transmission, receiving, or transceiver functionality.

According to additional aspects of the invention, preferred embodiments include moveable primary side coils.

According to aspects of the invention, preferred embodiments of a system for wireless power transmittal include a primary side having a plurality of non-coplanar primary coils and driver circuitry for driving the primary coils. This arrangement is provided with the capability of transmitting a signal through the primary side coils for receipt by a secondary side coil included on a secondary side adapted for receiving a power signal.

According to aspects of the invention, preferred embodiments of coupled inductor apparatus and systems for wireless power transfer also include data transmission functionality.

The invention has advantages including but not limited to one or more of, improved coupled inductor system power transfer, improved data transmission functionality, improved convenience in wireless charging systems, and reduced costs. These and other potential advantageous, features, and benefits of the present invention can be understood by one skilled in the arts upon careful consideration of the detailed description of representative embodiments of the invention in connection with the accompanying drawings.

BRIEF DESCRIPTION OF THE DRAWINGS

The present invention will be more clearly understood from consideration of the following detailed description and drawings in which.

References in the detailed description correspond to like references in the various drawings unless otherwise noted. Descriptive and directional terms used in the written description such as right, left, back, top, bottom, upper, side, et cetera, refer to the drawings themselves as laid out on the paper and not to physical limitations of the invention unless specifically noted. The drawings are not to scale, and some features of embodiments shown and discussed are simplified or amplified for illustrating principles and features as well as advantages of the invention.

DESCRIPTION OF PREFERRED EMBODIMENTS

The present patent application is related to U.S. patent application Ser. No. 13/430,338 which shares at least one common inventor with the present application and has a common assignee. Said related application is hereby incorporated herein for all purposes by this reference.

Figure 1:
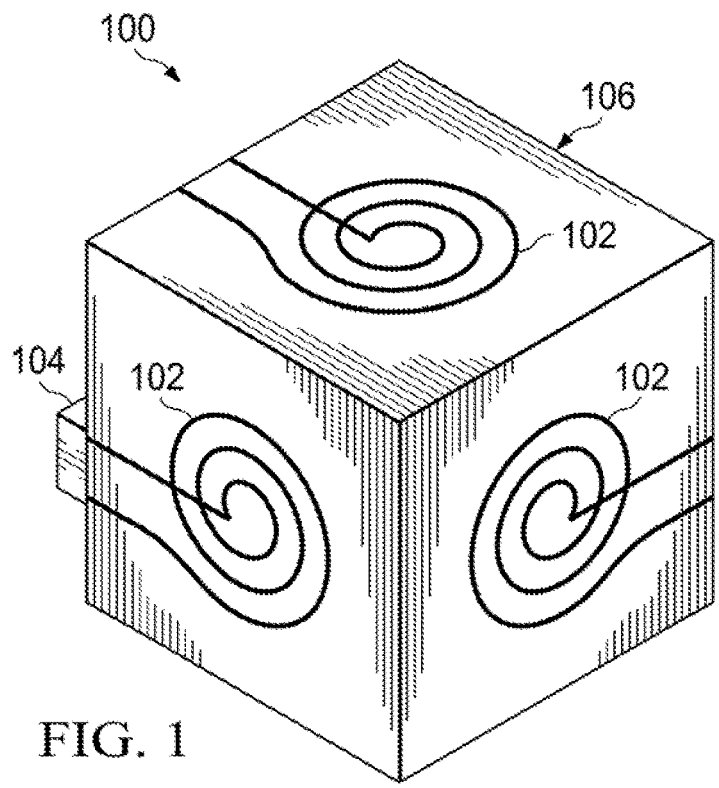
FIG. 1 is a simplified perspective view depicting an example of a preferred embodiment of wireless power transmittal apparatus according to the invention in which non-coplanar primary coils are deployed on a plurality of surfaces.

In the presence of an active primary coil, if a load is connected to the secondary coil of a coupled inductor system, an electric current flows in the secondary coil, and electrical energy is then transferred from the primary coil to the secondary coil, and ultimately to a load connected to the secondary side. An example of a preferred embodiment of apparatus for wireless power transmittal according to the invention is shown in FIG. 1. The apparatus 100 includes a number of primary coils 102 for transmitting power to a secondary side receiver (not shown in FIG. 1). A driver circuit 104 is coupled to the coils 102. Preferably, the driver circuit 104 is capable of adjustment in terms of frequency and amplitude in order to adjust transmission parameters. Suitable startup circuitry is provided in the driver circuit 104 in order to enable the apparatus 100 to achieve appropriate bias levels prior to driving the primary side coils 102. This preferably provides the capability for a smooth startup that mitigates or eliminates wasted energy and radiated emissions. Adjustable resistors may also be provided in order to regulate the amplitude of the transmitted signal for output at the primary side coils 102. The primary side coils 102 are preferably arranged so that they do not share the same plane. It has been found that providing primary side coils in non-coplanar configuration tends to provide favorable signal transmission coverage to a space in proximity to the primary side coils. Thus, it may be anticipated that placement of one or receivers having secondary coil(s) in this proximity facilitates reception of the transmitted signal(s) in all or most secondary coil orientations. As can be seen in the example of FIG. 1, the primary coils 102 are non-coplanar, arranged around the periphery of a container 106, in this case box-shaped. In presently preferred embodiments, primary coils (e.g., 102), are arranged in two to six different planes, although other non-coplanar arrangements may be used. It should be understood that a container (e.g., 106) may be implemented in various three-dimensional forms as alternatives to the generally rectangular box 106 shown without departure from the principles of the invention. For example, containers of tubular, cylindrical, envelope, pouch, bag, or pocket shape may also be used.

Figure 2:
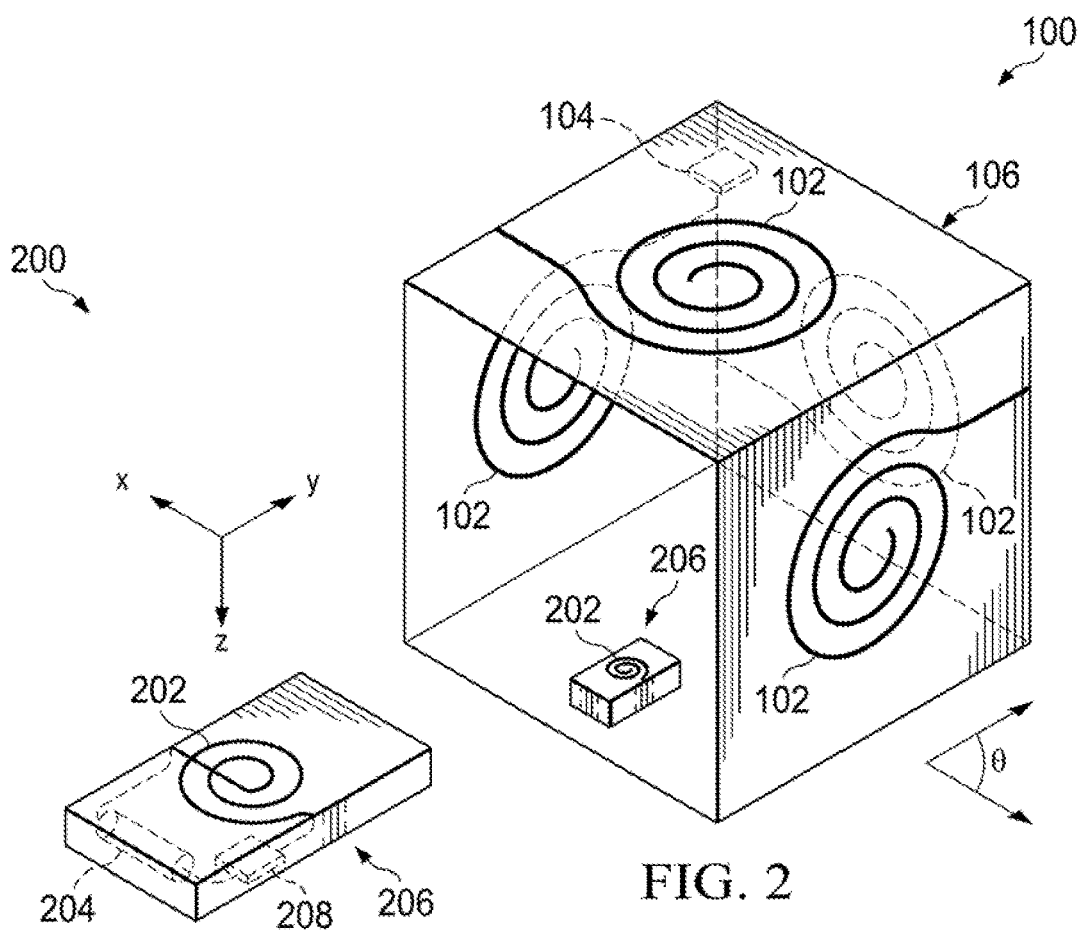
FIG. 2 is a simplified perspective view depicting an example of a preferred embodiment of wireless power transmittal apparatus according to the invention in which non-coplanar primary coils are deployed on a plurality of surfaces, and a secondary coil is positioned in proximity to the primary side apparatus.

In general, in accordance with the invention, one or more inductive resonance receivers having secondary coils may be placed in close proximity with the apparatus for wireless power transmittal as exemplified in and described with respect to FIG. 1. Now referring primarily to FIG. 2, another preferred embodiment of apparatus of the invention 200 is shown. It has been determined that a suitable secondary side coil 202 may be used to receive signals transmitted by the primary side coil(s) 102. In preferred embodiments of the invention, apparatus for wireless power transmittal 100 may be used for recharging power storage elements 204, including but not limited to batteries, capacitors, and supercapacitors. Preferably, electronic devices and systems, herein generally referred to as "receivers" 206 having secondary coils 202 are included in association with an electronic systems having additional functionality, such as cell phones, toys, 3D glasses, cameras, remote controls, and the like. Preferably, during periods when the receiver 206 is not being used, it is placed in proximity with the primary coils 102 of the power transmittal apparatus 100 for recharging with little or no care as to the orientation of the receiver 206 in relation to the primary coils 102. The secondary side receiver 206 includes a secondary side coil 202 suitable to be inductively coupled with the primary side coil 102 for receiving the signal output of the primary side apparatus 100. Preferably, the secondary side receiver 206 also includes circuitry 208 suitable for such functions as managing received signals, generating feedback signals such as power levels, load levels, and secondary side frequency, for use in making adjustments to the output of the primary side 100. The configuration of the power transmittal apparatus 100, providing non-coplanar coils 102, as shown on the periphery of the container 106 in this example, permits the transmission of one or more signals from one or more of the primary coils 102 to the secondary coil(s) 202 of the proximal receiver 206 without requiring precise, coplanar, or parallel alignment of the respective coils 102, 202. In this example, the box-like container 106 includes primary coils 102 on each of its three axes, X, Y, and Z, at various angles Θ, to provide multi-directional transmission of power signals to the secondary coil 202 almost without regard to the precise locations and/or orientations (Θ) of the receiver(s) 206. Although signals may be transmitted from primary coils to parallel or coplanar secondary coils, such alignment is not required. It is contemplated that apparatus may be implemented in accordance with the invention in configurations which preclude coplanar or parallel primary and secondary coils, for example with cylindrical primary side containers.

Figure 3:
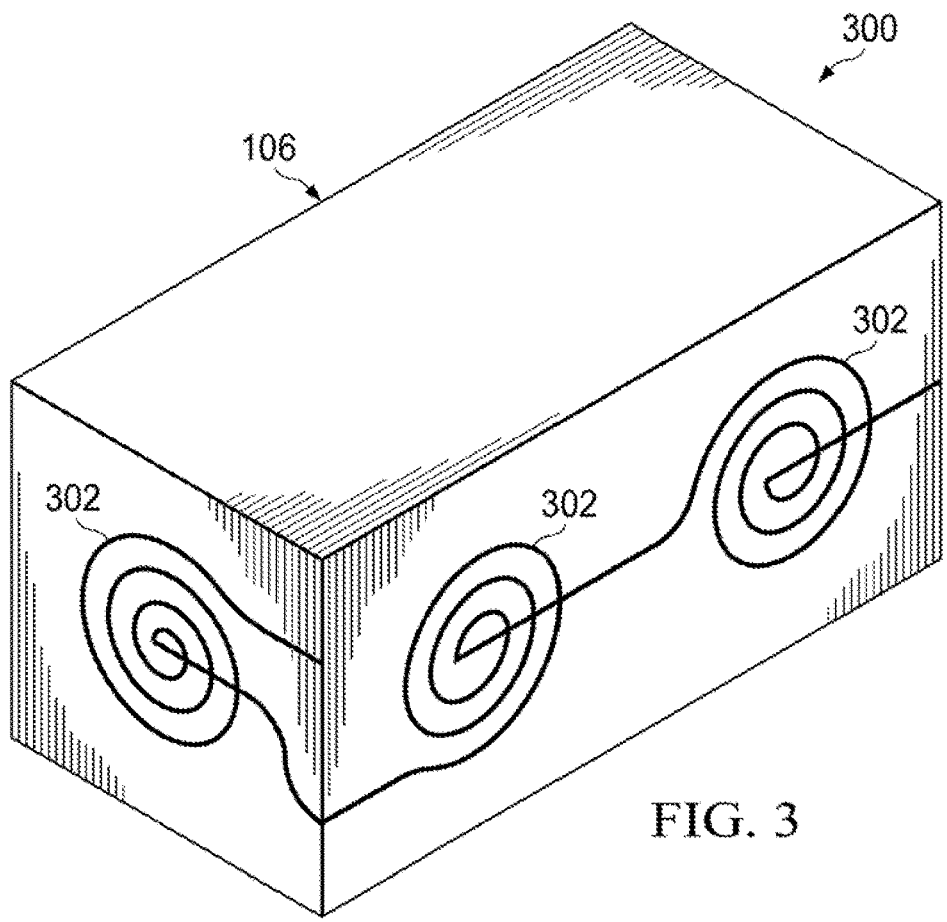
FIG. 3 is a simplified perspective view of wireless power transmittal apparatus illustrating an example of a preferred embodiment of the invention in which primary coils are configured in series.
Figure 4:
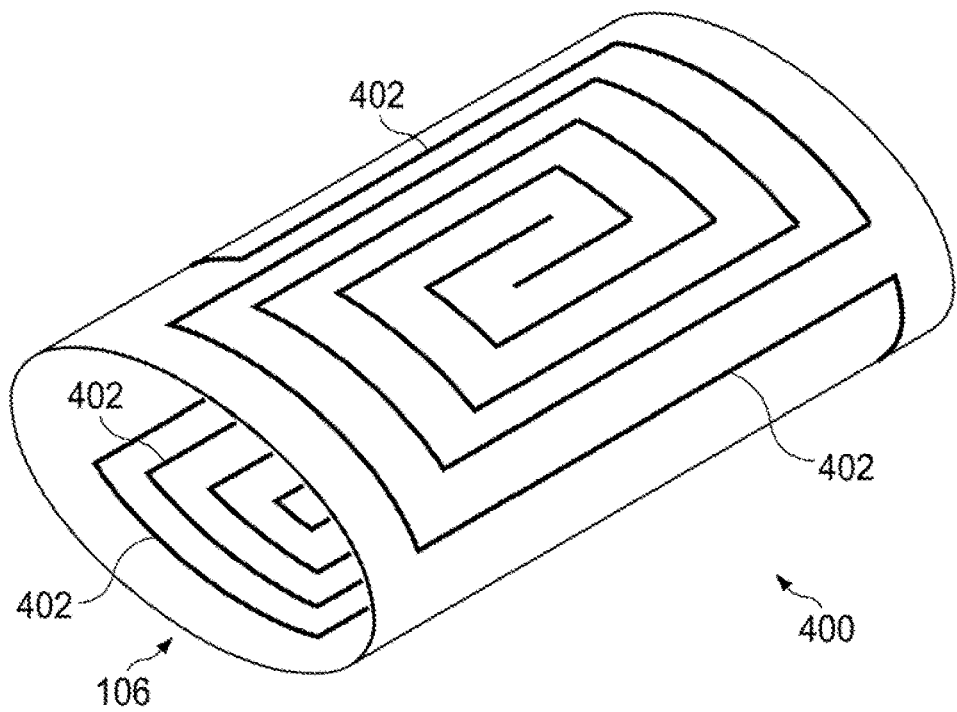
FIG. 4 is a simplified perspective view depicting an example of a preferred embodiment of wireless power transmittal apparatus according to the invention having interlaced primary coils.

Variations are possible within the scope of the invention and they cannot and need not all be shown. Examples of alternative embodiments are shown in FIG. 3 and FIG. 4. In the illustration of FIG. 3, apparatus 300 for wireless power transmittal has non-coplanar primary coils 302 connected in series. Operating the primary coils 302 in series transmits signals having various orientations for reception by suitable secondary coil(s). In FIG. 4, apparatus 400 is shown in which the primary coils 402 are arranged in an interlaced configuration. In this configuration, signals transmitted from the primary coils may be concentrated in specific areas in their proximity. Preferably, transmittals through the primary coils may be controlled by dynamic coil selection. Not shown in these partial views, it should be understood that the outside of the container 106 may be covered with electromagnetic shielding (not shown) to provide a Faraday Cage. This effectively eliminates or attenuates the emission of electromagnetic radiation from the container, and thereby reduces the potential of interference with other electronics or the environment. The container including the apparatus of the invention may be of a fixed nature, drawing power from a fixed source, or may be portable, in which case an energy storage element may be used to power to apparatus. In further variations, the apparatus of the invention may also be implemented in transmitter/receiver combinations, further described herein.

Figure 5:
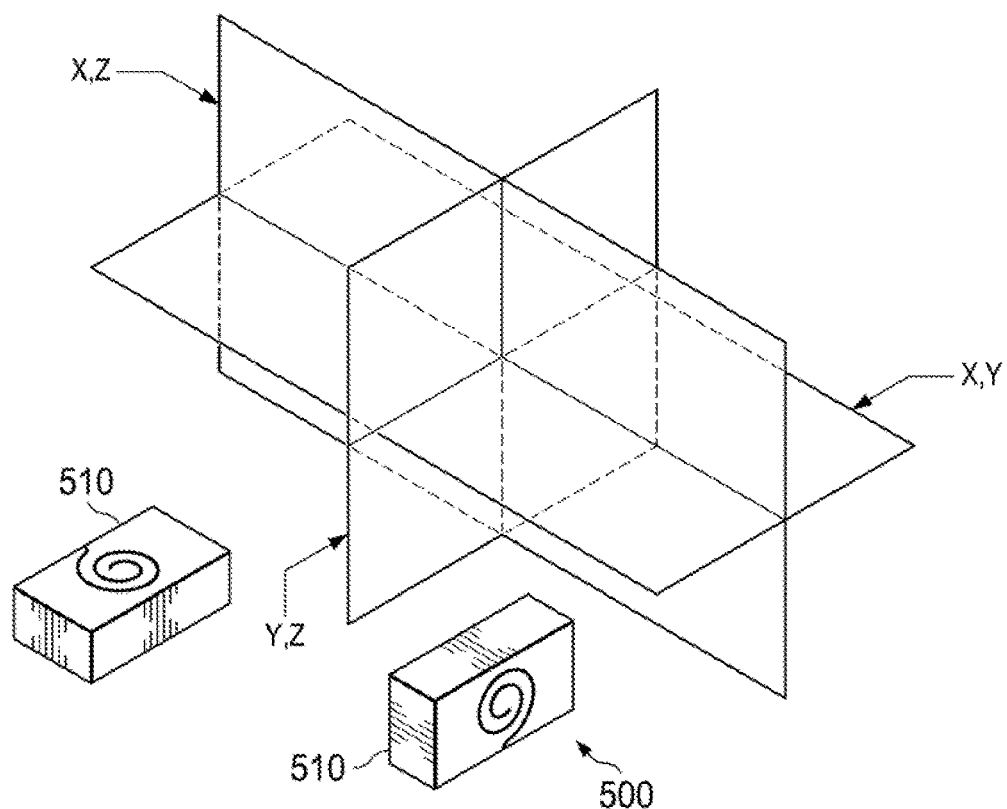
FIG. 5 is a simplified diagram illustrating a three-plane inductive resonance system in an example of a preferred embodiment of the invention.

In another example of an alternative embodiment of the invention depicted in FIG. 5, it can be seen that the apparatus 500 for wireless power transmittal may be implemented in forms that dispense with the container depicted elsewhere herein. The XY, YZ, and XZ planes in the apparatus 500 each contain one or more primary coils (not shown). It is contemplated that devices including suitable secondary coils, e.g. 510, may be placed in the proximity of the apparatus 500 in order to receive a signal therefrom. For example, the apparatus 500 may be embedded within a table lamp, and remote control devices containing secondary coils 510 may be placed near the lamp for recharging. Such a system may also include an energy storage element, which would be useful for power outages or to move the unit to a location that is not near a power outlet.

Figure 6:
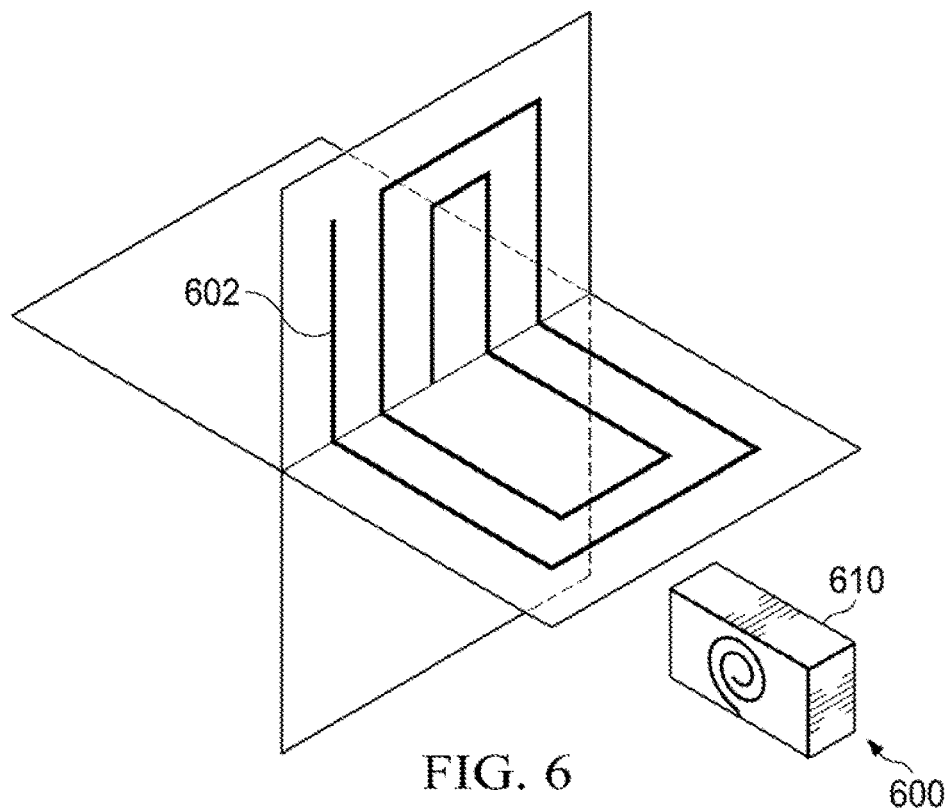
FIG. 6 is a simplified diagram of a portion of wireless power transmittal apparatus illustrating an example of a primary coil present in two planes in a preferred embodiment of the invention.

As shown in FIG. 6, it is not essential for the primary coils 602 in the invented wireless power transmittal apparatus 600 to lie entirely in one plane. The coil(s), e.g., 602, may lie in two or more planes. Thus, a signal transmitted from the coil shown 602, transmits in more than one direction for receipt by a suitable device 610 in proximity. Primary coils need not be on orthogonal planes, and may be oriented at various angles Θ. Preferably primary coil parameters can be changed based on anticipated and/or real-time operational conditions. For example, inductance values, number of windings, the selection of frequencies, and the propagation of different waveguides, may be changed without departure from the invention. Combinations of different planes may also be used to target specific transmission directions. This yields many possible different coil and plane combinations, which allows for flexibility in adjusting the transmission path/direction, either along the X, Y, and Z axes, or adjusting the angle Θ primary coil(s).

Figure 7:
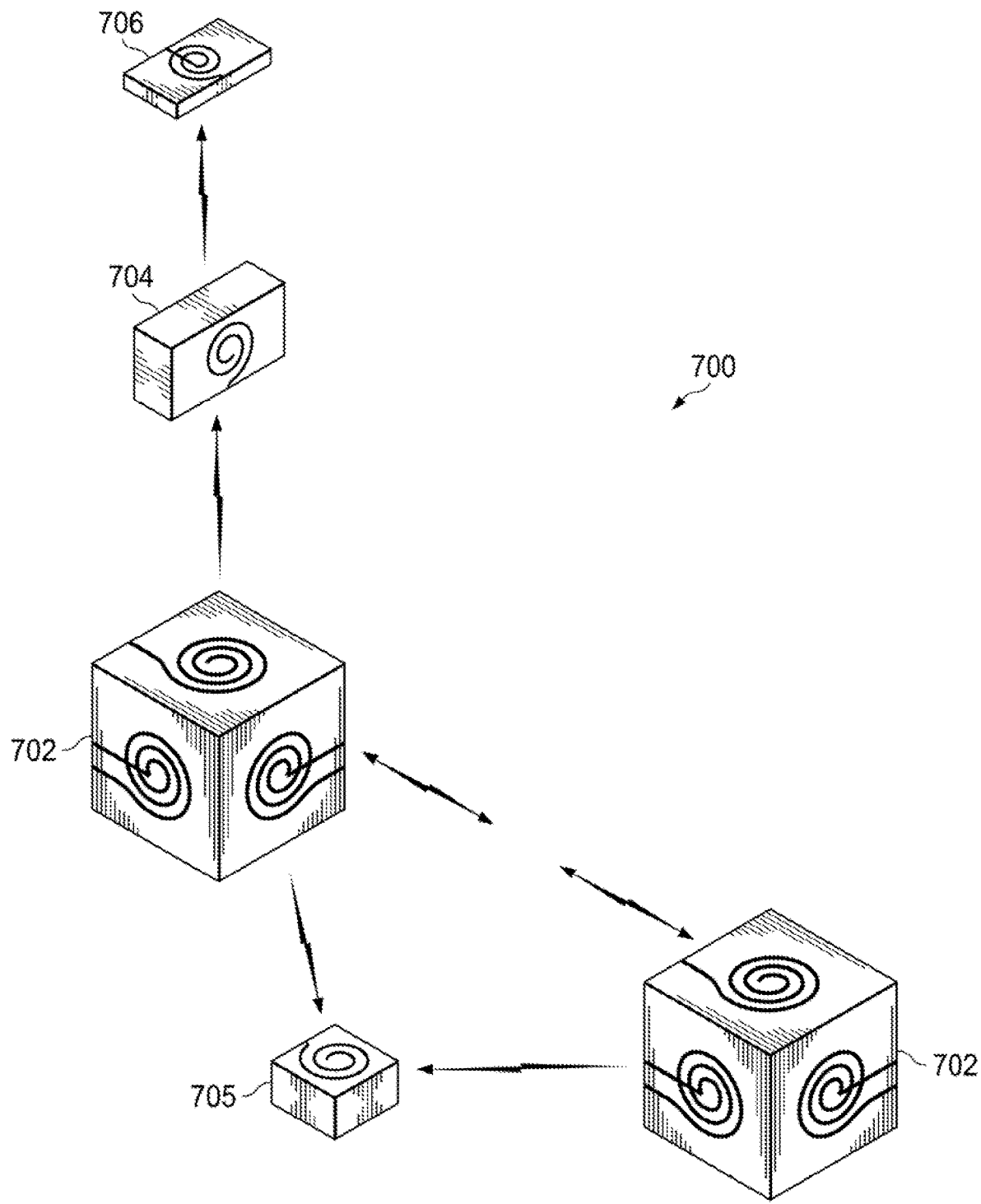
FIG. 7 is a simplified schematic diagram of wireless power transmittal apparatus illustrating an example of the use of preferred embodiments of the invention in combination within the context of a broader system.

It is within the scope of the invention to equip the wireless power transmittal apparatus with circuitry for performing both transmitting and receiving functions. As shown in FIG. 7, a system 700 may be deployed in which wireless power apparatus 702 is implemented as a transceiver. Using multiple transceiver apparatuses 702, the apparatus 702 may be inductively coupled in various combinations such as daisy chain, star, mesh, or other network configurations. These transceivers 702 may also include energy storage devices such as batteries in order to provide system flexibility, removing the limitation of requiring placement near power outlets. These transceiver units 702 can also be used as power repeaters to extend the distance for power transmission, or to provide a transmission path around obstacles. Communication between each of the receivers 702 is preferably maintained to improve power transfer and communicate system 700 parametric data such as power received, battery life remaining, charge rate, number of charge cycles, orientation, fault/warning conditions, and other operating parameters. The transceiver apparatus 702 may also be used in combination with transmit-only 704, and receive-only 706 units. A system 700 as shown in FIG. 7 may be used, for example, in the context of a home entertainment setup with charging apparatus 702, storage boxes 705, repeaters 704, and remote powered speaker receivers 706.

Without departure from the scope of the invention, the wireless power transmittal apparatus may be equipped with a communication protocol for providing communication functionality between each primary and secondary coil. Communication functions may include, for example, monitoring the amount of power received by a receiver. This allows the primary side transmitter to vary different parameters to help optimize the power transfer to the receiver. An example is to increase or decrease output power in selected primary coils to determine the best coil or coil combination to use to efficiently transfer the signal. Another example is to mount each primary coil on a movable assembly such as a motorized gimbal, to allow movement of the coil to various orientation angles to optimize power transmission. In a feedback loop, the primary side apparatus may alter the coil angle, and when the receiver reports its power received, this loop may then be repeated to find the most preferred coil position for present-time operating conditions. Another example of communication functions includes device identification, such as through a serial number. Providing each unit in a system (700, in FIG. 7) with a unique serial number, either programmable or assigned by the manufacturer, established their unique identities. If multiple receivers are placed in the proximity of the charging unit, e.g., 702, then the transmitter can query each receiver one at a time until all are in communication. Then, the transmitter can determine all or some of the following: which receiver should control the amount of power transmitted; which receiver should determine the appropriate primary coil(s) to use; which receiver should determine the orientation of the primary coil(s); and which receiver should determine other operating parameters of the transmitter. Preferably, receiver status parametrics can also be communicated, such as power received, battery life remaining, charge rate, number of charge cycles, orientation, fault/warning conditions, and other operating parameters. Communication may be embedded in the power transfer signal transmissions. One example is that power transfer and be turned on/off creating an on/off pulse stream of power that is interpreted into a data stream. Communication and other aspects of the invention are further described in the applications incorporated by reference.

While the making and using of various exemplary embodiments of the invention are discussed herein, it should be appreciated that the present invention provides inventive concepts which can be embodied in a wide variety of specific contexts. It should be understood that the invention may be practiced with coupled inductor systems having communications and power transfer functionality, such as for example, battery chargers, AC/DC converters, power supplies, and associated apparatus. For purposes of clarity, detailed descriptions of functions, components, and systems familiar to those skilled in the applicable arts are not included. The methods and apparatus of the invention provide one or more advantages including but not limited to, data transfer capabilities, managed power transfer capabilities, and enhanced energy utilization and conservation attributes. While the invention has been described with reference to certain illustrative embodiments, those described herein are not intended to be construed in a limiting sense. For example, variations or combinations of steps or materials in the embodiments shown and described may be used in particular cases without departure from the invention. Different coil shapes, coil materials, and additional magnetic materials, e.g. ferrite, may be used in the implementation of the apparatus of the invention. Various modifications and combinations of the illustrative embodiments as well as other advantages and embodiments of the invention will be apparent to persons skilled in the arts upon reference to the drawings, description, and claims.

We claim:

1. An apparatus comprising:
a first planar primary coil disposed on a structure in a first plane;
a second planar primary coil disposed on the structure in a second plane that is different from the first plane; and
driver circuitry operably coupled to the first primary coil and the second primary coil and configured to selectively activate one or both of the first primary coil and the second primary coil as a function of a location of a secondary coil external to the structure and to transmit power or data as a function of the selection.

2. The apparatus of claim 1 wherein the driver circuitry is configured to provide a power signal from the first primary coil and a data signal from the second primary coil to the secondary coil as a function of a location of the secondary coil.

3. The apparatus of claim 1 wherein the first primary coil and the second primary coil are connected in series and the secondary coil is disposed in a plane parallel to the first primary coil.

4. The apparatus of claim 1 wherein the first primary coil and the second primary coil are electrically interlaced and the secondary coil is disposed in a plane parallel to the second primary coil.

5. The apparatus of claim 1 further comprising a third planar primary coil disposed in a third plane that is different from the first plane and the second plane and the driver circuitry is configured to select a first combination of primary coils to transmit power and a second configuration of primary coils to transmit data and the secondary coil is disposed in a plane parallel to the third planar primary coil.

6. The apparatus of claim 1 further comprising a third planar primary coil that is disposed in two or more planes and the secondary coil is disposed in a plane parallel to the first primary coil.

7. The apparatus of claim 1 wherein the first primary coil and the second primary coil are configured to allow the secondary coil to be received between them.

8. The apparatus of claim 1 wherein the first primary coil and the second primary coil are disposed on a periphery of a container and the secondary coil is disposed in a plane parallel to the first primary coil and perpendicular to the second primary coil.

9. The apparatus of claim 1 wherein the first primary coil and the second primary coil and the driver circuitry are configured to transmit data to the secondary coil and the secondary coil is disposed in a plane parallel to the first primary coil and the second primary coil.

10. The apparatus of claim 1 wherein the first primary coil and the second primary coil and the driver circuitry are configured to receive battery data and power from the secondary coil.

11. The apparatus of claim 1 wherein the first primary coil and the second primary coil and the driver circuitry are configured to transceive data to and from the secondary coil.

12. The apparatus of claim 1 wherein the first primary coil and the second primary coil are deployed on a plurality of surfaces of a container.

13. The apparatus of claim 1 wherein one or more of the first primary coil and the second primary coil are moveable.

14. A system for wireless power transmittal in a coupled inductor system, comprising:
a first primary coil disposed on a first structure in a first plane;
a second primary coil disposed on a second structure in a second plane;
first driver circuitry operably coupled to the first primary coil and second driver circuitry operably coupled to the second primary coil and configured to selectively cause a power signal or a data signal to be transmitted from one or both of the first primary coil and the second primary coil;
a secondary side coil external to the first structure and the second structure; and
wherein the secondary side coil is configured to receive the power signal from the first primary coil and the second primary coil.

15. The system of claim 14 wherein the first primary coil and the second primary coil are connected in series.

16. The system of claim 14 wherein the first primary coil and the second primary coil are electrically interlaced.

17. The system of claim 14 further comprising third primary coil disposed in a third plane.

18. The system of claim 14 further comprising a third primary coil disposed in a plurality of planes.

19. The system of claim 14 wherein the first primary coil and the second primary coil are arranged in at least two planes such that the secondary coil can be received between them.

20. The system of claim 14 wherein the first primary coil and the second primary coil are arranged on a periphery of a container.

\* \* \* \* \*